United States Patent [19]
Rühringer et al.

[11] Patent Number: 5,727,839
[45] Date of Patent: Mar. 17, 1998

[54] ROOF ARRANGEMENT FOR CLOSING OFF A ROOF CUTOUT OF A MOTOR VEHICLE

[75] Inventors: Erich Rühringer, Magstadt; Wolfgang Adam, Nagold; Volker Richters, Sindelfingen, all of Germany

[73] Assignee: Mercedes-Benz AG, Stuttgart, Germany

[21] Appl. No.: 906,144

[22] Filed: Aug. 5, 1997

Related U.S. Application Data

[63] Continuation of Ser. No. 568,450, Dec. 7, 1995, abandoned.

[30] Foreign Application Priority Data

Dec. 7, 1994 [DE] Germany ............... 44 43 525.8

[51] Int. Cl.⁶ ................................................. B60J 7/047
[52] U.S. Cl. ........................... 296/213; 296/216; 296/220
[58] Field of Search ............................. 296/213, 216, 296/220; 49/476.1, 495.1

[56] References Cited

U.S. PATENT DOCUMENTS

| | | | |
|---|---|---|---|
| 4,474,402 | 10/1984 | Shelton et al. ................... | 296/76 |
| 4,529,243 | 7/1985 | Kaltz et al. ..................... | 296/107 |
| 4,664,439 | 5/1987 | Schaetzler et al. ............... | 296/213 |
| 4,678,227 | 7/1987 | Catagno .......................... | 296/213 |
| 4,729,593 | 3/1988 | Sisigachi et al. ................. | 296/154 |
| 4,984,843 | 1/1991 | Villa et al. ...................... | 296/213 |
| 5,335,961 | 8/1994 | Reinsch et al. ................... | 296/223 X |

FOREIGN PATENT DOCUMENTS

| | | | |
|---|---|---|---|
| 2 147 028 | 3/1973 | France . | |
| 2566723 | 1/1986 | France ............ | 296/216 |
| 3545887OC2 | 6/1987 | Germany . | |
| 3924036C1 | 10/1990 | Germany . | |
| 4227400 | 2/1994 | Germany ........... | 296/216 |
| 60-206724 | 10/1985 | Japan . | |
| 2-117420 | 5/1990 | Japan . | |
| 6-32429 | 8/1994 | Japan . | |
| 8502764 | 5/1987 | Netherlands ...... | 296/213 |
| 2205536A | 12/1988 | United Kingdom . | |
| 2 259 284 A | 3/1993 | United Kingdom . | |

OTHER PUBLICATIONS

French Search Report dated May 2, 1996 France.
British Search Report dated Jan. 10, 1996 Great Britain.

*Primary Examiner*—Dennis H. Pedder
*Attorney, Agent, or Firm*—Evenson McKeown Edwards & Lenahan, PLLC

[57] ABSTRACT

An elastic seal is provided in the region of the abutment edges of adjacent roof parts. The elastic seal is arranged on a water-discharge channel of a rear roof part and exhibits an integral, elastically compliant sealing section which, by means of an abutment edge of the movable roof part, depending on an opening or a closing movement of said roof part, can be moved between a relieved rest position, in which it forms a splash guard and is opened out upwards, and a loaded position, in which it covers over the water discharge means in a sealing manner. The roof parts are part of a lamella roof of a passenger car.

15 Claims, 1 Drawing Sheet

ROOF ARRANGEMENT FOR CLOSING OFF A ROOF CUTOUT OF A MOTOR VEHICLE

BACKGROUND AND SUMMARY OF THE INVENTION

This application is a continuation of application Ser. No. 08/568,450 filed on Dec. 7, 1995, now abandoned.

The invention relates to a roof arrangement for closing off a roof cutout of a motor vehicle, having at least one roof part which is arranged in a movable manner and having a roof part which is adjacent towards the rear in the vehicle longitudinal direction and, in the region of its end side which faces the movable roof part, is provided with an elastic seal which extends along a longitudinal joint between the adjacent roof parts, is arranged on a water-discharge means of the rear roof part and exhibits an integral, elastically compliant sealing section which, in the event of an opening movement of the roof part, assumes a relieved rest position, in which it is opened out upwards.

Such a roof arrangement is known from German Patent Document DE 35 45 870 C2. Said roof arrangement exhibits an elastic seal in the region of a water-discharge means of the rear roof part. The elastic seal is provided with an elastically compliant lug which is in an upright state when the roof part has been pushed back and is an integral part of the elastic seal. However, said lug is arranged in the region of the front border of the roof cutout since the elastic seal constitutes the seal for the sliding roof cover.

A roof arrangement is also known from British Patent Document GB 2 259 284 A. The roof arrangement is a lamella roof which exhibits a plurality of movable lamella roof parts. The lamella roof part which is adjacent towards the rear in the vehicle longitudinal direction in each case exhibits, in the region of its front end side, an elastic hollow-profile seal which, when the lamella roof is in the closed state, interacts with a corresponding rear end side of the lamella roof part which is adjacent towards the front, and seals the longitudinal joint between the adjacent lamella roof parts.

U.S. Pat. No. 4,664,439 discloses a further roof arrangement, which exhibits a roof part which can be opened out upwards or removed. Adjacent to said movable roof part towards the rear in the vehicle longitudinal direction is a stationary roof part of the motor vehicle, which stationary roof part bounds the roof cutout to the rear and, on the edge which butts against the movable roof part, is provided with an elastic hollow-profile seal. Provided beneath the elastic hollow-profile seal of the stationary roof part is a water-discharge channel on whose front edge is arranged a splash guard which projects upwards in the non-loaded stake and is in the form of an elastic web profile. In the closed state of the movable roof part, said web profile rests in a corresponding convexity of the abutment edge, facing the stationary roof part, of the movable roof part.

An object of the invention is to provide a roof arrangement of the type mentioned in the introduction, which exhibits a seal which is improved in terms of construction and function.

This object is achieved according to preferred embodiments of the invention in that the sealing section, by means of an abutment edge of the movable roof part in the event of a closing movement of said roof part, can be moved into a loaded position, in which it covers over the water-discharge device in a sealing manner and seals the longitudinal joint. In addition to its function for sealing the roof arrangement, the seal thus serves to assist the water-discharge device, in that, by virtue of being opened out upwards, it constitutes a splash guard. Since the sealing section is integral with the seal, merely a single component is necessary for fulfilling the various functions. The roof arrangement according to the invention may be realized both in the form of a lamella roof with a plurality of adjoining lamella roof parts and in the form of an individual roof part which can be opened out or removed and/or can be moved in a sliding manner.

In one development of the invention, the sealing section exhibits a bead which, when the roof cutout is closed, projects upwards through a gap remaining in the region of the longitudinal joint between the roof parts and projects out beyond the outer contour of the roof parts. The bead of the sealing section forms an elevation, which provides visual compensation for the differences in level of the roof parts with respect to one another and for any tolerances occurring in the region of the longitudinal joint. In addition, said bead forms an additional damper for adjacent abutment edges of the roof parts. The bead is especially advantageous in a roof arrangement which is designed as a lamella roof with a plurality of roof parts arranged one behind the other.

In a further development of the invention, the seal is provided with a hollow-profile section which, when the roof cutout is closed, rests in a sealing manner against an associated underside of the movable roof part. Said hollow-profile section constitutes an additional seal which, moreover, exerts a damping action on the movable roof part.

In a further development of the invention, the seal is arranged on the rear roof part, forming a front wall of the water-discharge device in the process. Since the seal itself forms one of the walls of the water discharge means, a simplified form of the water-discharge device with an angular profile is sufficient.

In a further development of the invention, the seal is plugged onto a web of the rear roof part in the region of the water-discharge means. This is a simple and functionally reliable method of fastening for the seal.

In a further development of the invention, between the sealing section and the hollow-profile section, the seal exhibits an outflow duct which runs parallel to said sections and is intended for water which has entered by capillary action. Consequently, the seal has a further additional function.

Other objects, advantages and novel features of the present invention will become apparent from the following detailed description of the invention when considered in conjunction with the accompanying drawings.

DETAILED DESCRIPTION OF THE DRAWINGS

Figure 1:
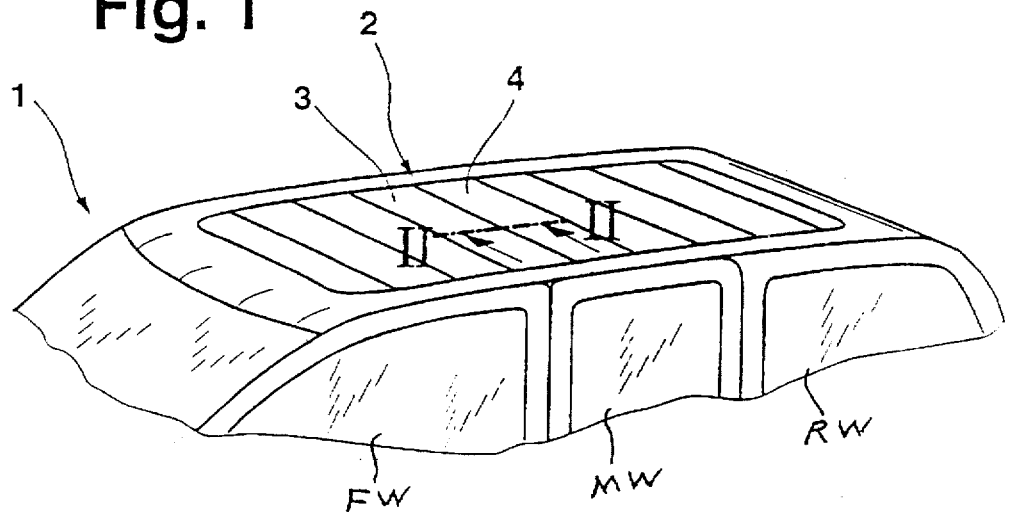
FIG. 1 shows, in a perspective representation, part of a passenger car whose roof is provided with an embodiment of an inventive roof arrangement in the form of a lamella roof which exhibits six lamella roof parts.

A passenger car (1) according to FIG. 1 exhibits, in the region of its roof, a roof cutout which exposes the interior of the passenger compartment and can be closed off by means of a roof arrangement (2).

The roof arrangement (2) is a lamella roof which, in its closed position, forms a sheet-like planar lamella assembly comprising a plurality of lamella roof parts. In order to open the lamella roof, the various lamella roof parts can be moved rearwards in the vehicle longitudinal direction by means of a drive device, in which case said lamella roof parts gradually separate in a rear region of the roof cutout and open out obliquely upwards such that they are lined up in a row one against the other. In the illustrated preferred embodiment the roof cutout extends over a substantial portion of the length of the front side window FW adjacent a front seat section, and over the entire length of the rear side door window MW and over a substantial part of a rear window RW.

In the planar lamella assembly, i.e. when the lamella roof has been closed, a front lamella roof part (3) adjoins a rear lamella roof part (4) in a flush manner, the surface (5) of the front lamella roof part (3) and the surface (6) of the rear lamella roof part (4) being located approximately at the same level in a common plane and thus being in alignment with one another. That side of the lamella roof parts (3, 4) which projects towards the interior exhibits a cladding (12) in each case. The front lamella roof part (3) exhibits, in the region of its rear end, in extension of the surface (5), a web-like continuation (7) which, in the closed state of the lamella roof, overlaps a front end side of the rear lamella roof part (4) at a distance. The front end side of the rear lamella roof part (4) exhibits, in extension of an underside, a continuation (8) which projects forwards in the manner of a web and whose free end is bent upwards in the direction of the web-like continuation (7) of the other lamella roof part (3) in order to form a plug-on border (9). An angular profile, which constitutes a channel which is open at the top and is intended for a water-discharge device, is formed by an end edge (10) of the lamella roof part (4), the continuation (8) and the plug-on border (9).

By means of a plug-on profile, an elastic seal (13) produced from rubber is plugged onto the plug-on border (9) of the water-discharge device and is retained thereon in a stable manner. The elastic seal (13) is produced in one piece and exhibits a profile which extends over the entire length of the plug-on border (9), i.e. over the entire width of the lamella roof part (4) and of the corresponding roof cutout of the passenger car. In especially preferred embodiments the elastic seal 13 has a constant cross-section over its length. The elastic seal (13) exhibits two sections (15, 17), which project in the manner of a V and form between them a channel-like depression in the form of an outflow duct (18). One of the two sections is a hollow-profile section (17) which projects towards the adjacent lamella roof part (3) and, in the closed state of the lamella roof, rests in a sealing manner against the underside of the web-like continuation (7), in a corner region thereof. Said hollow-profile section (17) serves, on the one hand, for sealing and, on the other hand, for damping movements of the lamella roof part (3) which occur when the vehicle is in motion.

Figure 2:
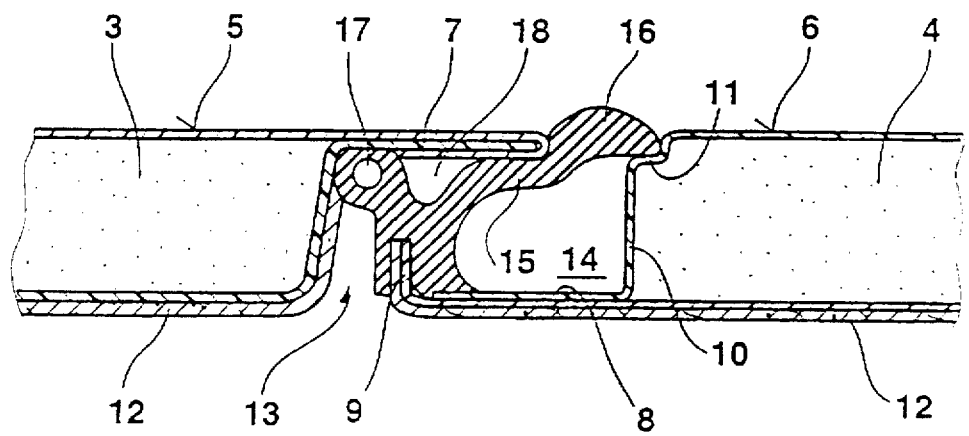
FIG. 2 shows, in an enlarged representation, a section through the roof arrangement according to FIG. 1 along section line II—II in FIG. 1.
Figure 3:
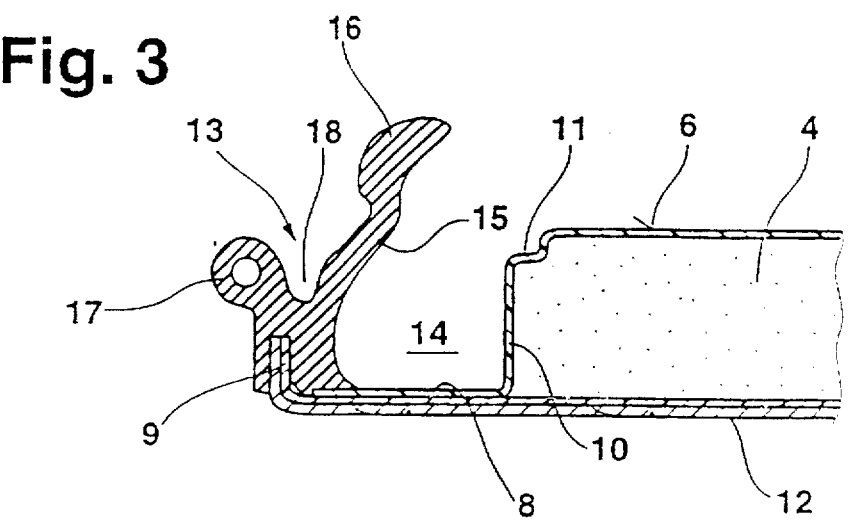
FIG. 3 shows the rear of the two lamella roof parts according to FIG. 2, in a position in which the front lamella roof part—not shown—is separated from the rear lamella roof part.

The other section constitutes a sealing section (15) which projects towards the lamella roof part (4) and, in the relieved, non-loaded state (FIG. 3), projects obliquely upwards. The length of the sealing section (15) is dimensioned such that its free end can be supported on a shoulder (11) of the lamella roof part (4) above the end edge (10). The sealing section (15) is elastically compliant, such that it is pressed against the shoulder (11) by means of the web-like continuation (7) of the adjacent lamella roof part (3) during closure of the lamella roof, and thus closes off the water-discharge device or channel (14). The outer side of the profile of the sealing section (15) is formed such that it exhibits an undulation which forms a resting surface for the web-like continuation. In the non-loaded state, the sealing section (15) projects beyond the surface (6) of the lamella roof part (4), with the result that the inner side of the sealing section (15) forms, on the one hand, that wall of the water-discharge channel (14) which is located opposite the end edge (10) and, on the other hand, a splash guard. As soon as the loading by means of the web-like continuation (7), in the closed state of the lamella roof, has been removed from the sealing section (15), the latter automatically opens out obliquely upwards into the rest position represented in FIG. 3. In contrast, in the loaded state (FIG. 2), the sealing section (15) closes off the water-discharge channel (14) in a sealing manner. In the region of its free end, the sealing section (15) additionally exhibits, on its outer side, a bead (16) which, in the loaded position of the sealing section (15), in which the latter bears on the shoulder (11), is arranged between the remaining gap of the longitudinal joint between the two lamella roof parts (3, 4), between the surface (5) and the surface (6). The bead (16) projects out upwards, in the profile, in the manner of a hump beyond the surfaces (5 and 6) of the two lamella roof parts (3, 4). This elevation provides visual compensation, on the one hand, for tolerances due to different gap sizes between the various lamella roof parts of the lamella roof and, on the other hand, for differences in level between the respectively adjacent surfaces (5, 6) of the various lamella roof parts (3, 4).

In the closed state of the lamella roof, in which state the hollow-profile section (17) bears in a sealing manner on the underside of the web-like continuation (7) of the lamella roof part (3) and the sealing section (15) bears in a sealing manner on the shoulder (11) of the lamella roof part (4), closing off the water-discharge channel (14) in the process, the outflow duct (18) is formed between said sections on the underside of the web like continuation (7), which duct serves to channel away water which has entered by capillary action. Both the outflow duct (18) and the water-discharge channel (14) each lead into water channels which are arranged laterally on the roof cutout.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle roof arrangement for a vehicle comprising:

a roof cutout in an upwardly facing roof of a vehicle, a forward roof part and a rearward roof part disposed in use to be movable longitudinally with respect to one another between a roof cutout closed position and a roof cutout open position, a water discharge channel extending laterally of the roof cutout along a forward edge of the rearward roof part, and an elastic seal extending along the forward edge of the rearward roof part in front of the water discharge channel, said elastic seal being movable between an unstressed position, with a portion protruding upwardly of the rearward roof part to form a splash guard in front of the water discharge channel while uncovering the water discharge channel in the upward direction, and a stressed position sealingly covering said water discharge channel, said elastic seal including a forwardly facing abutment edge engageable in use with a rearward edge of the forward roof part to be forcibly moved from the unstressed position to the stressed position in response to roof cutout closing movement of the forward roof part with respect to the rearward roof part such that, when said roof parts are in a roof cutout closed position, said elastic seal sealingly covers the water discharge channel and also seals said forward and rearward roof parts with respect to one another.

2. Roof arrangement according to claim 1, wherein the elastic seal exhibits a bead which, when the roof cutout is closed, projects upwards through a gap remaining in a region of a joint between the roof parts and projects out beyond an outer contour of the roof parts.

3. Roof arrangement according to claim 2, wherein the elastic seal is provided with a hollow-profile section which, when the roof cutout is closed, rests in a sealing manner against an associated underside of the forward roof part.

4. Roof arrangement according to claim 1, wherein the elastic seal is disposed on the rear roof part and is configured to form a front wall of the water discharge channel.

5. Roof arrangement according to claim 4, wherein the elastic seal is plugged onto a plug-on web of the rear roof part in a region of the water-discharge channel.

6. Roof arrangement according to claim 3, wherein the elastic seal includes a rearward which sealingly engages the rearward roof part behind the water discharge channel when in said stressed position, and wherein the elastic seal forms an upwardly facing outflow duct between the rearward portion and the hollow-profile section, which outflow duct is covered in use when the elastic seal is in said stressed position by a part of the forward roof part and extends parallel to and in front of said water discharge channel and is intended for water which has entered by capillary action.

7. Roof arrangement according to claim 2, wherein the elastic seal is disposed on the rear roof part and is configured to form a front wall of the water discharge channel.

8. Roof arrangement according to claim 7, wherein the elastic seal is provided with a hollow-profile section which, when the roof cutout is closed, rests in a sealing manner against an associated underside of the forward roof part.

9. Roof arrangement according to claim 8, wherein the elastic seal is plugged onto a plug-on web of the rear roof part in the region of the water discharge channel.

10. Roof arrangement according to claim 1, wherein the elastic seal includes a rearward portion which sealingly engages the rearward roof part behind the water discharge channel when in said stressed position, and wherein the elastic seal forms an upwardly facing outflow duct between the rearward portion and the hollow-profile section, which outflow duct is covered in use when the elastic seal is in said stressed position by a part of the forward roof part and extends parallel to and in front of said water discharge channel and is intended for water which has entered by capillary action.

11. Roof arrangement according to claim 10, wherein the hollow-profile section, when the roof cutout is closed, rests in a sealing manner against an associated underside of the movable roof part.

12. Roof arrangement according to claim 8, wherein the elastic seal includes a rearward portion which sealingly engages the rearward roof part behind the water discharge channel when in said stressed position, and wherein the elastic seal forms an upwardly facing outflow duct between the rearward portion and the hollow-profile section, which outflow duct is covered in use when the elastic seal is in said stressed position by a part of the forward roof part and extends parallel to and in front of said water discharge channel and is intended for water which has entered by capillary action.

13. Roof arrangement according to claim 1, wherein said roof arrangement is a lamella roof arrangement with a plurality of said movable rear roof parts.

14. Roof arrangement according to claim 1, wherein the elastic seal is provided with a hollow-profile section which, when the roof cutout is closed, rests in a sealing manner against an associated underside of the forward roof part.

15. Roof arrangement according to claim 1, wherein the elastic seal includes:

a rearward portion which sealingly engages the rearward roof part behind the water discharge channel when in said stressed position, and a forward portion which sealingly engages the forward roof part when in said stressed position, and wherein said elastic seal forms an upwardly facing outflow duct between the rearward portion and the forward portion covered in use when the elastic seal is in the stressed position by the forward roof part, which outflow duct extends parallel to and in front of said water discharge channel and is intended for water which has entered by capillary action.

* * * * *